(12) United States Patent
Styles et al.

(10) Patent No.: US 12,738,971 B2
(45) Date of Patent: Sep. 15, 2026

(54) METROLOGY RADIO COMMUNICATIONS SYSTEM

(71) Applicant: RENISHAW PLC, Wotton-under-Edge (GB)

(72) Inventors: John Anthony Styles, Wotton-under-Edge (GB); Paul Anthony Taylor, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 266 days.

(21) Appl. No.: 18/283,250

(22) PCT Filed: Apr. 6, 2022

(86) PCT No.: PCT/GB2022/050855
§ 371 (c)(1),
(2) Date: Sep. 21, 2023

(87) PCT Pub. No.: WO2022/219307
PCT Pub. Date: Oct. 20, 2022

(65) Prior Publication Data

US 2024/0178879 A1 May 30, 2024

(30) Foreign Application Priority Data

Apr. 14, 2021 (EP) .................................... 21168397

(51) Int. Cl.
*H04B 1/7156* (2011.01)

(52) U.S. Cl.
CPC .................................. *H04B 1/7156* (2013.01)

(58) Field of Classification Search
CPC .................................................... H04B 1/7156
See application file for complete search history.

(56) References Cited

U.S. PATENT DOCUMENTS 4,442,527 A * 4/1984 Munday ............... H04B 1/7156 375/135
4,606,040 A 8/1986 David et al.
(Continued)

FOREIGN PATENT DOCUMENTS

CN 1732488 A 2/2006
CN 1820426 A 8/2006
(Continued)

OTHER PUBLICATIONS

Jun. 14, 2022 International Search Report issued in International Patent Application No. PCT/GB2022/050854.
(Continued)

*Primary Examiner* — Chandrahas B Patel
(74) *Attorney, Agent, or Firm* — Oliff PLC

(57) ABSTRACT

A frequency hopping radio communications system includes a measurement station having a first clock and an interface station having a second clock. The measurement station transmits measurement information from a measurement event. The measurement information includes timing information relating the measurement event to the first clock. The interface station receives the measurement information and generates a measurement output including timing information relative to the second clock. One of the first and second clocks is designated as a master clock and a periodic clock adjustment of the other is performed to maintain synchronisation with the designated master clock. The timing information of the measurement output generated by the interface station takes into account any of the periodic clock adjustments that are applied between the occurrence of the measurement event and the generation of the measurement output. In this manner, jitter is reduced and metrology performance is improved.

18 Claims, 4 Drawing Sheets

(56) References Cited

U.S. PATENT DOCUMENTS

| | | | | |
|---|---|---|---|---|
| 5,519,717 | A * | 5/1996 | Lorenzo | H04B 1/7156 375/E1.037 |
| 6,173,004 | B1 | 1/2001 | Ohashi | |
| 6,345,066 | B1 | 2/2002 | Haartsen | |
| 7,408,916 | B2 * | 8/2008 | Kassinen | H04J 3/0644 375/357 |
| 7,821,420 | B2 | 10/2010 | Woollett et al. | |
| 9,008,149 | B2 | 4/2015 | Huettinger et al. | |
| 9,140,547 | B2 | 9/2015 | Woollett et al. | |
| 9,423,235 | B2 | 8/2016 | Jordil et al. | |
| 11,209,258 | B2 | 12/2021 | Styles et al. | |
| 2002/0159434 | A1 | 10/2002 | Gosior et al. | |
| 2003/0128741 | A1 | 7/2003 | Chun | |
| 2005/0195772 | A1 | 9/2005 | Nishikawa et al. | |
| 2006/0215614 | A1 | 9/2006 | Woollett et al. | |
| 2007/0287542 | A1 | 12/2007 | Miyazaki et al. | |
| 2011/0002361 | A1 | 1/2011 | Woollett et al. | |
| 2012/0004886 | A1 | 1/2012 | Jordil et al. | |
| 2013/0273965 | A1 | 10/2013 | Jechoux et al. | |
| 2014/0119408 | A1 | 5/2014 | Huettinger et al. | |
| 2014/0204930 | A1 * | 7/2014 | Knowles | H04N 21/4305 370/338 |
| 2015/0190099 | A1 | 7/2015 | Aratani | |
| 2016/0072548 | A1 | 3/2016 | Shih et al. | |
| 2019/0376777 | A1 | 12/2019 | Styles et al. | |
| 2024/0171213 | A1 | 5/2024 | Styles et al. | |
| 2024/0171214 | A1 | 5/2024 | Styles et al. | |

FOREIGN PATENT DOCUMENTS

| | | | |
|---|---|---|---|
| CN | 103796295 | A | 5/2014 |
| CN | 104619238 | A | 5/2015 |
| CN | 105915265 | A | 8/2016 |
| EP | 2402714 | A1 | 1/2012 |
| EP | 2901920 | A1 | 8/2015 |
| EP | 4075680 | A1 | 10/2022 |
| EP | 4324102 | B1 | 11/2025 |
| JP | 5877905 | B2 | 3/2016 |
| WO | 99/60718 | A1 | 11/1999 |
| WO | 2004/057552 | A1 | 7/2004 |
| WO | 2006/006899 | A1 | 1/2006 |
| WO | 2014/091202 | A1 | 6/2014 |
| WO | 2018/134585 | A1 | 7/2018 |
| WO | 2022/219306 | A1 | 10/2022 |

OTHER PUBLICATIONS

Jun. 14, 2022 Written Opinion issued in International Patent Application No. PCT/GB2022/050854.
Jun. 9, 2022 International Search Report issued in International Patent Application No. PCT/GB2022/050855.
Jun. 9, 2022 Written Opinion issued in International Patent Application No. PCT/GB2022/050855.
U.S. Appl. No. 18/283,065, filed Sep. 20, 2023 in the name of Styles.
Jun. 9, 2022 International Search Report issued in International Patent Application No. PCT/GB2022/050853.
Jun. 9, 2022 Written Opinion issued in International Patent Application No. PCT/GB2022/050853.
U.S. Appl. No. 18/283,279, filed Sep. 21, 2023 in the name of Styles.
Jan. 3, 2025 U.S. Office Action issued in U.S. Appl. No. 18/283,279.
Jun. 12, 2025 Office Action issued in U.S. Appl. No. 18/283,279.
Toll, Analog Scanning vs. Touch Probing. (Jan. 7, 2020).
May 27, 2026 Notice of Allowance issued in U.S. Appl. No. 18/283,065.

* cited by examiner

P
F1
F2
F3
F4
F5
F6
F7
F8
t = 250μs

P
I
F1'
F2'
F3'
F4'
F5'
F6'
F7'
F8'
F9'
F9
36
38
249
248

METROLOGY RADIO COMMUNICATIONS SYSTEM

The present invention relates to a frequency hopping radio communications system comprising a measurement station and an interface station. In particular, the present invention relates to a frequency hopping radio communications system for passing metrology (measurement) data from a machine tool measurement probe to an associated probe interface.

Co-ordinate positioning apparatus (e.g., machine tools) are often equipped with a measurement device, for example a touch trigger probe which measures the position of points on the surface of a workpiece. A touch trigger probe has a stylus which, when deflected by contact with a surface, produces a so-called trigger signal. This trigger signal is used to freeze the outputs of the measurement scales of the machine tool thereby indicating the position of the probe and thus, with appropriate calibration, the position of a point on the surface of the workpiece.

In certain circumstances, for example when it is difficult to wire a probe directly to a machine controller, a wireless transmission system is used to communicate the trigger signal to the machine controller via a probe interface. In particular, it is known to use a frequency hopping spread spectrum (FHSS) communications link between the probe and probe interface. Such a communications protocol is described in WO2004/057552 and is also used in the "RMP" range of machine tool probes and the associated "RMI" probe interfaces sold by Renishaw plc, Wotton-under-Edge, Gloucestershire, UK. A similar FHSS communications protocol is also used in the Primo range of measurement probes, also sold by Renishaw plc. It has been found that the above described FHSS systems provide robust communications in often harsh (RF) operating environments.

Frequency hopping communication links rely on maintaining close synchronisation between the two stations at each end of the link, regardless of whether a transmission is going to be made. This is to ensure the two stations hop together (i.e., in synchronisation) between the frequency channels according to a predefined hopping pattern. The maintenance of such frequency channel synchronisation is especially important for systems that relay time critical information, such as the trigger event information transmitted between a measurement probe an associated interface. For example, in the above described RMI/RMP system, there is periodic adjustment of the clock provided in the interface to maintain synchronisation with the master clock of the probe.

The present inventors have, however, found the above-described real-time clock adjustment process can affect the metrology accuracy of the FHSS communication system, especially when communicating asynchronous measurement events such as trigger signals.

According to a first aspect of the invention, there is provided a frequency hopping radio communications system, comprising a measurement station having a first clock and an interface station having a second clock, wherein;

the measurement station is configured to transmit measurement information arising from a measurement event, the measurement information including timing information that relates the measurement event to the first clock, the interface station is configured to receive the measurement information from the measurement station and to generate a measurement output including timing information defined relative to the second clock, and one of the first and second clocks is designated as a master clock and a periodic clock adjustment of the other of the first and second clocks is performed to maintain synchronisation with the designated master clock, characterised in that the timing information of the measurement output generated by the interface station takes into account any of the periodic clock adjustments that are applied between the occurrence of the measurement event and the generation of the measurement output.

The present invention thus relates to a frequency hopping spread spectrum (FHSS) radio communication system in which a wireless (FHSS) radio communication link is provided between a measurement station (e.g. provided as part of a battery operated measurement device) and an interface station (e.g. provided as part of a measurement interface that is hardwired to a machine tool). The measurement and interface stations both include their own clocks, which are termed the first and second clocks respectively. As explained below, the first and second clocks may include oscillators and be arranged to output a series of clock pulses at the same nominal intervals.

The measurement station is configured to transmit measurement information arising from a measurement event. For example, the measurement station may transmit information about touch trigger events that are generated by a touch trigger sensor. The measurement information also includes timing information that links the measurement event to a timing derived from the first clock. The timing information may be provided as data (e.g. a time value) and/or it may be encoded in the transmitted message (e.g. the edges of transmitted frames may be synchronised to the first clock). In a preferred embodiment described below, the timing information comprises a clock count defining a time a measurement event occurred within a frame (e.g. relative to the starting edge of that frame).

The interface station is configured to receive the measurement information from the measurement station. In other words, the interface station is arranged to receive the measurement information transmitted by the measurement station (i.e. over the FHSS link). The interface station is also configured to generate a measurement output that includes timing information defined relative to the second clock. In other words, a measurement output (e.g. a trigger signal) is output from the interface station to an associated apparatus (e.g. a machine tool) at a certain time. The interface station times all events relative to its own clock (i.e. the second clock) and hence the measurement output is made at a time defined relative to the second clock.

As mentioned above, the measurement and interface stations necessarily use different clocks. Although such clocks could be nominally identical, it is typically impractical or impossible to provide clocks that remain fully synchronised over long periods of time. In order to maintain frequency hopping synchronisation, the first and second clocks thus need to be periodically aligned or synchronised. To achieve this, one of the first and second clocks is designated as a master clock (i.e. all system timing are to be tied to this master clock). A periodic clock adjustment of the other of the first and second clocks is then performed to maintain synchronisation with the designated master clock. As explained below, this synchronisation can be performed by periodically sending timing messages between the measurement and interface stations. These timing messages may be sent at regular or irregular intervals. A plurality of such timing messages can thus be sent whilst the FHSS communications link is established between the measurement station and the interface station. Such timing messages allow the real-time synchronisation of the first and second clocks to be maintained. This ensures that the frequency hopping at the measurement and interface stations remains synchronised thereby preventing clock drift that may otherwise cause a gradual loss of frequency hopping synchronisation. This maintenance of clock synchronisation is performed "on the fly"; i.e., the periodic synchronisation can be performed whilst the communications link is being used to transmit measurement information from the measurement station to the interface station.

In prior art FHSS systems as described above, the periodic synchronisation of clocks is performed to maintain synchronised frequency hopping at both ends of the communications link. However, it has been found by the present inventors that performing such a clock synchronisation step at or around the same time as communicating measurement information from the measurement station to the interface station can introduce a metrology error. In other words, the applied clock correction isn't accounted for (i.e., it's effect is ignored) when generating the measurement output. For example, nudging the first clock count up or down to maintain clock synchronisation can lead to an erroneous conversion of times measured relative to the first clock into times measured relative to the second clock (i.e., the nudges to the clock count introduce a timing difference that appears as a timing error).

The system of the present invention thus takes account of (i.e., uses or incorporates) any timing changes that were used to maintain clock synchronisation when calculating the time (relative to the second clock) at which the measurement output should be generated. The timing information of the measurement output generated by the interface station thus takes into account any of the periodic clock adjustments that are applied between the occurrence of the measurement event and the generation of the measurement output. In other words, any periodic clock adjustments that are applied between the occurrence of the measurement event and the generation of the measurement output are incorporated into the timing information of the measurement output that is generated by the interface station. Any applied timing changes are thus included by the interface station when calculating the time (relative to the second clock) at which the measurement output should be generated. This may be thought of as correcting the time (relative to the second clock) at which the measurement output is generated in order to account for the applied timing changes. In this manner, clock synchronisation is maintained in real-time without degrading measurement accuracy.

Advantageously, the measurement information transmitted by the measurement station is timestamped relative to a time defined by the first clock. For example, the measurement information may include a time value (as defined by the first clock) that defines when a certain measurement event occurred. The timestamp may thus comprise data defining a time. In a preferred embodiment, the measurement station transmits information to the interface station using a series of frames and the interface station operates using a similar series of frames. Each frame may be allocated a frequency channel, in accordance with a cyclically repeating hopping pattern or sequence that is known to both the measurement and interface stations. The measurement information may thus be timestamped by the measurement station to define a time relative to the edge of a frame. For example, a 250 μs frame may be subdivided into 250 counts from the clock. In such an example, the timestamp associated with the measurement information may define the count (i.e. as a numerical value between 0 and 249) during which the measurement event occurred.

Advantageously, the first and second clocks each generate clock counts. For example, each clock may include an oscillator that increments a clock count value. Such a clock count value may be cyclical. One of the first and second clocks may be designated as a master clock. The periodic clock adjustment may then comprise incrementing or decrementing the clock count of the other of the first and second clocks to maintain synchronisation (i.e. of the clock count) with the designated master clock. In this manner, the measurement and probe stations may generate a series of clock counts that are aligned (synchronised) with one another. Frames may be defined by a plurality of such clock counts (e.g. they may be 250 clock counts of 1 μs duration defining a 250 μs frame) and the edges of such frames will thus also remain synchronised. The system may thus allow the first and second clocks to be (and to remain) synchronised to within 1 ms, more preferably to within 250 μs, more preferably to within 100 μs or more preferably to within 10 μs.

The periodic clock adjustment may be performed in any suitable manner. Conveniently, the periodic clock adjustment comprises the exchange of messages between the measurement and interface stations that include timing information. For example, the measurement station may transmit its current clock count value to the interface station. Alternatively, the measurement station may transmit a message at a certain time (or clock count) as defined by its (first) clock. The interface station may receive the transmission from the probe station and compare the timing information provided by the received message within the time defined by its (second) clock. This would allow any difference in count between the first and second clocks to be determined. After establishing any timing (e.g. count) differences, the interface station may then instruct the probe station to alter its first clock to remove that difference. For example, the probe station could receive instructions to add clock counts to a frame, or skip clock counts in a frame, so as to bring the counts of the first and second clocks back into synchronisation.

The periodic clock adjustment may be performed at irregular intervals; e.g. on demand or when messages (e.g. conveying measurement information) are exchanged between the probe and interface stations. Preferably, the periodic clock adjustment is performed at regular (periodical) intervals. This ensures synchronisation is maintained, even when no other messages are being exchanged by the probe and interface stations. In addition to any regular clock adjustments, ad hoc clock adjustments may also be performed (e.g., when passing on measurement information). A plurality of such clock adjustments may thus be performed.

The first or second clock may be used as the master clock for system timing. Advantageously, the second clock is the master clock and the periodic clock adjustment comprises adjusting the first clock to remain synchronised with the second clock. The master clock may thus be the (second) clock provided in the interface station. The second clock may also be used to define timings for other components of the system, such as apparatus to which the interface station is connected.

Advantageously, the measurement station may be provided as part of a measurement device. The measurement device may also include a measurement sensor. The measurement sensor may generate metrology data. The measurement sensor may be of any type. For example, the measurement sensor may comprise at least one of a touch trigger sensor, a scanning sensor, an ultrasound sensor or an imaging sensor. The measurement sensor may allow the measurement of dimensions, positions, temperature etc. The measurement sensor may be a contact sensor (i.e., it may physically touch an object being measured) or it may be a non-contact sensor (e.g., it may use optical, inductive, capacitive etc sensing).

In a preferred embodiment, the measurement sensor of the measurement device comprises a touch trigger sensor. The touch trigger sensor may sense a trigger event on attaining a certain spatial relationship with a point on the surface of an object. For example, a trigger event may be sensed when a stylus is deflected. The measurement device may be provided as a measurement probe for a machine tool. The measurement device may be battery operated. It is therefore advantageous for the measurement device to use as little electrical power as possible to maximise battery life. The measurement probe may also include at least one of a stylus, a shank and a battery.

The measurement information transmitted by the measurement station may relate to a touch trigger event as sensed by a touch trigger sensor. Such a touch trigger measurement event may occur at any point in time. The measurement output generated by the interface station may comprise a trigger signal. For example, such a touch trigger signal may be output by latching the voltage of a line connected to the SKIP input of the controller or by generating a pulse or series of pulses that are passed to the SKIP input. The trigger signal may alternatively be passed to the controller over a digital data bus (e.g., as described in WO2018/134585). The measurement event may thus comprise an asynchronous measurement event. In other words, a measurement isn't recorded at a particular time but instead the measurement event can occur at an undefined point in time (e.g. when a stylus contacts an object). The time that such a measurement event occurs can thus be used to measure the position of a point on the surface of an object. It is thus preferred that the delay between the asynchronous measurement event being recorded by the probe station and the generation of the measurement output by the interface station is unaffected by any periodic clock adjustments that are applied between the measurement event and the generation of the measurement output. In other words, the latency of the system is preferably unaffected by the periodic clock adjustment process.

The communications link between the probe and interface stations is preferably a two-way communications link. The probe and interface stations preferably both transmit and receives radio signals over multiple frequency channels which are preferably spread over a certain frequency band (e.g. over the 2.4 GHz radio band). Data packets may then be transmitted and received during each frame on the designated frequency channel. The probe and interface stations may be operable in a plurality of different modes. For example, a plurality of communication modes using different frame rates may be implemented. A plurality of different hopping patterns may also be used. For example, the interface station may use different hopping patterns to communicate with different measurement stations. However, it should be remembered that both the probe and interface stations communicating with one another need to use the same hopping pattern to maintain hopping synchronisation. In other words, the measurement station and the probe station preferably comprise frequency hopping spread spectrum modems operating using the same hopping pattern. An acquisition mode may also be implemented where the measurement station passively receives information (whilst hopping between channels) until an activation message is received from the measurement station.

The probe and interface stations may include communication modules implemented in a variety of ways. For example, such communication modules may comprise a suitably configured circuit or processor. The communication modules may also comprise a RF antenna or be connectable to an associated RF antenna. The communication modules may also comprise a processor for calculating the hopping patterns (e.g., from a unique identifier). The communications module may be formed as a circuit board (e.g., an FPGA) for mounting inside a measurement probe and/or within a measurement probe interface. The circuit board may implement other functions connected to the frequency hopping communications or for other processes. Other components may be included within the probe station or interface station.

The plurality of frequency channels used by the system may comprise frequency channels within the 2.4 GHz radio frequency band (which extends from 2.4000-2.4835 GHz). This is also known as the Industrial, Scientific and Medical (ISM) band and is licence free in most countries. Each frequency channel may be 2 MHz wide, although it should be noted that any transmission may only be over a part of the frequency range of each channel. In a preferred embodiment, 39 channels are provided (each 2 MHz wide) that extend from 2.404 GHz to 2.480 GHz. It should be noted that the invention may be used in any radio frequency band and is not limited to ISM band operation. Preferably, the system is configured to operate on a standard, licence free, wireless frequency band. It should be noted that such frequency bands may vary from country to country, or over time, depending on regulatory rules but this does not alter the benefits associated with the present invention. It should also be noted that the frequency hopping radio communications system and its components may be classed as a digital transmission system (DTS) or a hybrid system, rather than a FHSS system as per the formal Federal Communications Commission (FCC) definition.

According to a second aspect of the present invention, there is provided a method of using a frequency hopping radio communications system that comprises a measurement station having a first clock and an interface station having a second clock, the method comprising the steps of; transmitting measurement information from the measurement station to the interface station, the measurement information transmitted by the measurement station arising from a measurement event and including timing information that relates the measurement event to the first clock, receiving the measurement information at the interface station and generating a measurement output that includes timing information related to the second clock, and designating one of the first and second clocks as a master clock and periodically adjusting the other of the first and second clocks to maintain synchronisation with the designated master clock, characterised by taking into account, when generating the timing information of the measurement output generated by the interface station, any periodic clock adjustments that are applied between the measurement event and the generation of the measurement output. In other words, the method may include the step of incorporating into the timing information of the measurement output (i.e., that is generated by the interface station) any periodic clock adjustments that are applied between the occurrence of the measurement event and the generation of the measurement output. The method may also include any of the features described above in connection with the associated apparatus.

Also described herein is a frequency hopping radio communications system. The system may comprise a measurement station. The measurement station may have a first clock. The system may comprise an interface station. The interface station may have a second clock. The measurement station may be configured to transmit measurement information arising from a measurement event (e.g., a touch trigger event). The measurement information may include timing information that relates the measurement event to the first clock. The interface station may be configured to receive the measurement information from the measurement station. The interface station may be configured to generate a measurement output including timing information that relates the measurement event to the second clock. One of the first and second clocks may be designated as a master clock and a periodic clock adjustment of the other of the first and second clocks may be performed to maintain synchronisation with the designated master clock. The timing information of the measurement output generated by the interface station may take into account any of the periodic clock adjustments that are applied between the occurrence of the measurement event and the generation of the measurement output. In other word, timing corrections may be implemented that account for the clock adjustments.

The invention will now be described, by way of example only, with reference to the accompanying drawings, in which.

Figure 1:
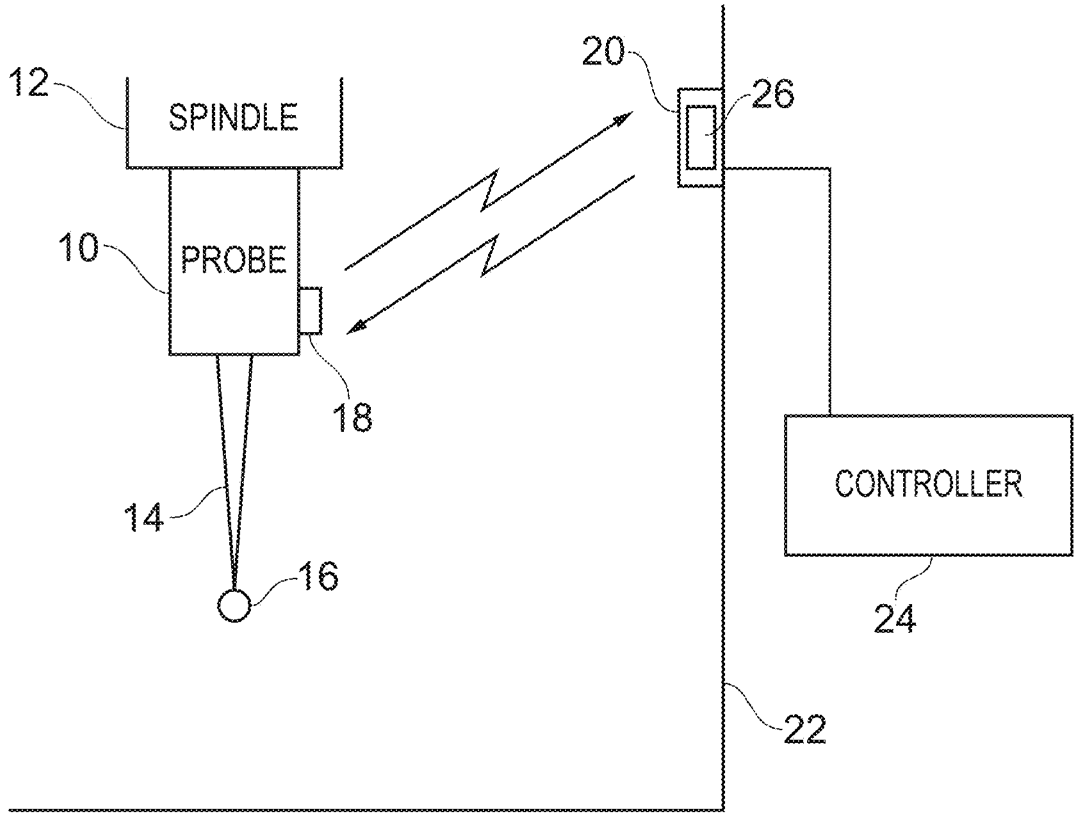
FIG. 1 illustrates a machine tool measurement probe and probe interface.

Referring initially to FIG. 1, there is illustrated a touch trigger measurement probe 10 mounted to the spindle 12 of a machine tool. The measurement probe 10 has a deflectable stylus 14 with a workpiece-contacting tip 16. The measurement probe also includes a first frequency hopping radio communications module or station 18 that would typically be integrated within the body of the measurement probe but is shown separately in FIG. 1 for clarity. A measurement probe interface 20 is mounted on a stationary part 22 of the machine tool structure and is connected (typically via a cable) to the machine tool controller 24. The measurement probe interface 20 also includes a second frequency hopping radio communications module or station 26.

Data is transmitted between the measurement probe 10 and the probe interface 20 via a frequency hopping radio communications link that is established between the first frequency hopping radio communications module 18 and the second frequency hopping radio communications module 26. As noted above, the first and second frequency hopping radio communications modules need to hop between frequency channels in synchronisation in order to allow a communications link to be established. The sequence in which the various different frequency channels are used is typically termed the “hopping pattern”. In a prior art system, the hopping pattern describes the order or sequence in which the different frequency channels will always be used and is used to ensure that, after appropriate synchronisation, both ends of the radio link are transmitting/receiving on the same frequency channel at the same point in time (assuming both ends use the same frame rate). In other words, the hopping pattern describes the sequence of “hopping” between the different frequency channels. For further information, reference is made to WO2004/057552, the contents of which are hereby incorporated herein by reference.

In a frequency hopping system, both ends of the link (i.e., the probe and interface stations) need to maintain close synchronisation. As one frame rolls over to the next, both ends of the link will change to the next channel in the hopping sequence or pattern, regardless of whether a transmission is going to be made. This enables the two ends of the link to be ready to make and receive a data packet on the correct channel and at the correct time.

Figures 2, 3:
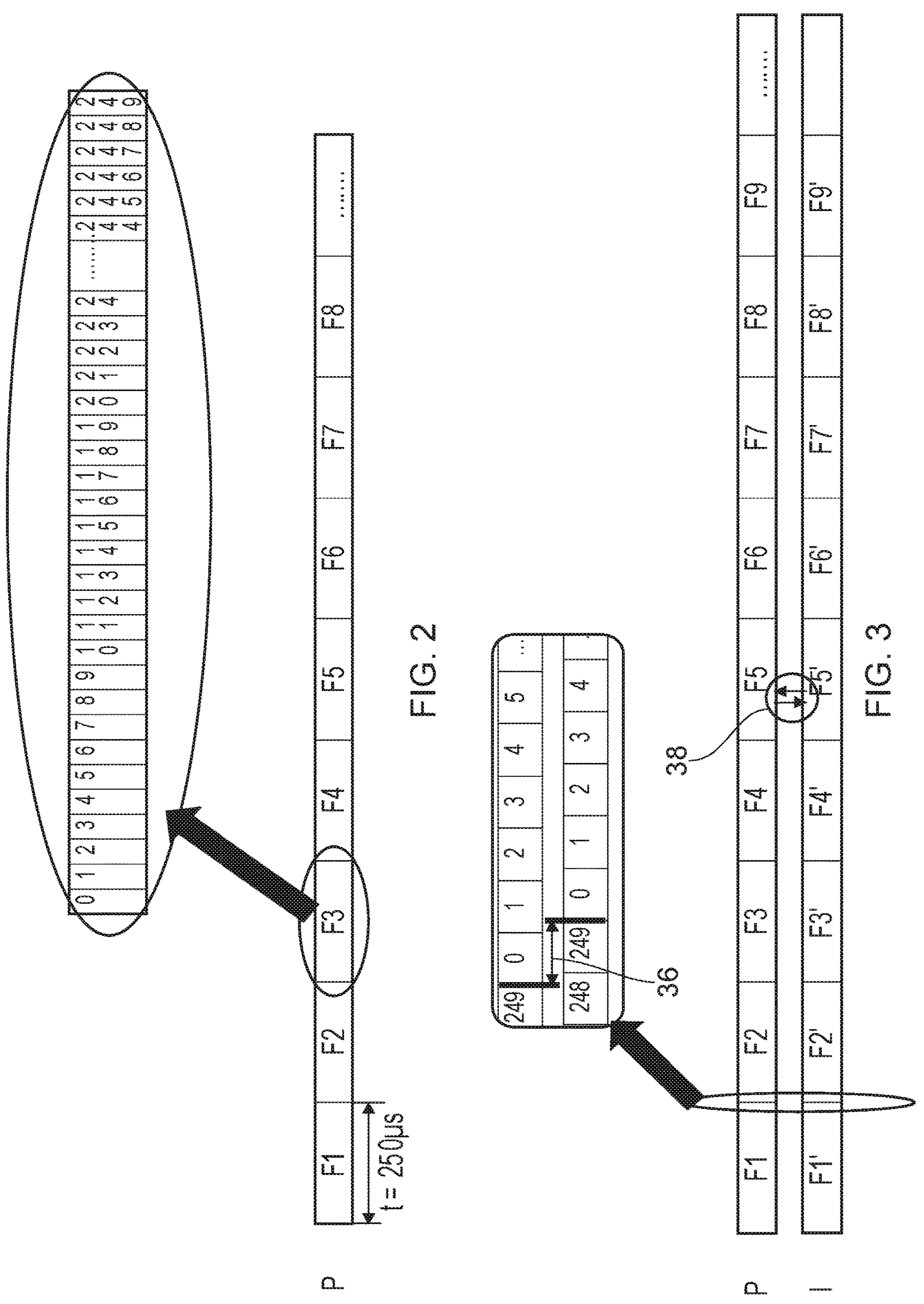
FIG. 2 shows the clock counts of a frame.
FIG. 3 illustrates the potential for the clocks of the probe and interface to drift and how this can be periodically corrected.

Referring to FIG. 2, multiple frames (F1 to F8) of the probe station are shown. The frequency channel used for transmitting/receiving information is changed each frame, in accordance with the so-called hopping pattern. In this example, each frame has a duration of 250 μs. This frame duration is timed using a clock within the probe that counts from 0 to 249 in 1 μs intervals. As shown in the inset to FIG. 2, the 250 counts generated by the probe clock define each frame. The clock count of 0 defines the start of the frame and the clock count of 249 is the last count of that frame. The clock count thus increments from 0 to 249 before being reset to zero for the start of the next frame.

In the above-described system where a probe and associated interface are communicating over a frequency hopping link, there will be different clocks within the probe and interface. Most oscillators used in electronic circuits to provide clock signals are characterised under certain defined conditions. At these defined operating parameters, the oscillators will have a tolerance (i.e., an acceptable deviation from the ideal operating frequency) that will vary from one oscillator device to another. Any deviation from the defined conditions, such deviations in operating temperature, will lead to a difference in the oscillation frequency. This difference is even more pronounced if the probe and interface are used in such a way that one of the units is at a different temperature to the other. The crystals used in oscillators are also prone to changes (drift) in oscillation frequency over time; this is known as ageing. It is therefore necessary to design a system that is tolerant of crystal drift, but also one that can compensate for it in operation, such that ultimate metrology accuracy is not affected, even after many years of service.

Referring to FIG. 3, the effect of a very small difference in the oscillation frequency of the clocks provided within the probe and interface is illustrated. Frames F1 to F9 of the probe are shown with the corresponding frames F1' to F9' of the interface. Although approximately temporally aligned, the inset to FIG. 3 shows that drift between the probe and interface clocks has caused the start of the frames F2 and F2' to be slightly offset by the time indicated by arrow 36. Although this slight frame misalignment is unlikely to affect the communication of data, it would likely increase (accumulate) over time until the frames of the probe and interface were no longer aligned, whereupon the probe and interface would no longer be using the same frequency channels together (i.e., the frequency hopping synchronisation would be lost) and communications would fail.

This problem of clock drift has been addressed previously in the prior art frequency hopping systems mentioned above. In particular, it is known for there to be a periodic transmission between the probe and the interface (labelled 38 in FIG. 3) to resynchronise the clocks. In simple terms, the probe may send a message at a certain count within a frame. For example, the probe may transmit a status message on count 74 within a certain frame. The interface may read this message and compare the clock count of the probe to its own count. If the counts differ, the interface may send a message back to the probe telling the probe to adjust its clock count to bring it into synchronisation with the count of the interface clock. For example, the interface may tell the probe to skip or add a certain number of counts to the next frame to provide the necessary clock re-alignment.

Considering a more specific example, the probe may send a so-called heartbeat message to its associated interface once every 32 ms (regardless of the frame rate). If a message is missed, the probe will retry every frame. The interface will wait until one of the following two things occurs: (a) the message sent by the probe is received by the interface or (b) 63 ms passes without a heartbeat message, in which case the interface will output an error. After outputting an error, it will start searching for a probe to re-connect to (i.e. it will try to establish a communications link from scratch).

For such an example, the maximum acceptable drift between two period oscillators will thus occur in the latter case (b). To calculate this drift, some details about the crystals being used to drive the modem on both the probe and interface can be use. For example, the oscillation frequency is 32 MHz and the calibration tolerance is ±15 ppm. The frequency stability over the temperature range of −20 to 85° C. is ±15 ppm and the ageing effect is less than ±3 ppm per year. If a worst-case scenario is considered, the following assumptions can be made: (i) the probe and interface are at opposite ends of the calibration tolerance, (ii) the probe and interface are at opposite ends of the usable temperature range and (iii) this correlates with opposite ends of the frequency stability range. In addition (iv) the probe and interface are both five years old and have aged according to the worst-case scenario, in opposite directions to each other.

Taking all of the above into account, for this example about 2.8 ps of drift will occur between the two clocks on every single clock cycle. Assuming that the largest number of clock cycles that can occur between corrections (adjustments) is about 2 million cycles, then the amount of drift that could have occurred is around 5.67 μs. This drift will get worse with probe age and could be up to 7.56 μs for a ten-year-old probe.

The previous RMI/RMP and Primo metrology probe systems mentioned above would adjust for such clock drift to maintain frame timings and robust communications. However, these small adjustments were not compensated for, if a metrology point occurred near or at the same time. The present inventors have found that this would manifest itself as jitter, namely small variations in switching times which would present itself as small differences in measurement position. To achieve the most repeatable accurate system, the present invention compensates for any timing adjustments when issuing a metrology point. Approximately, and ignoring other effects, this has been found to improve the timing accuracy of metrology events by about a factor of twenty. This will now be explained in more detail.

Figure 4:
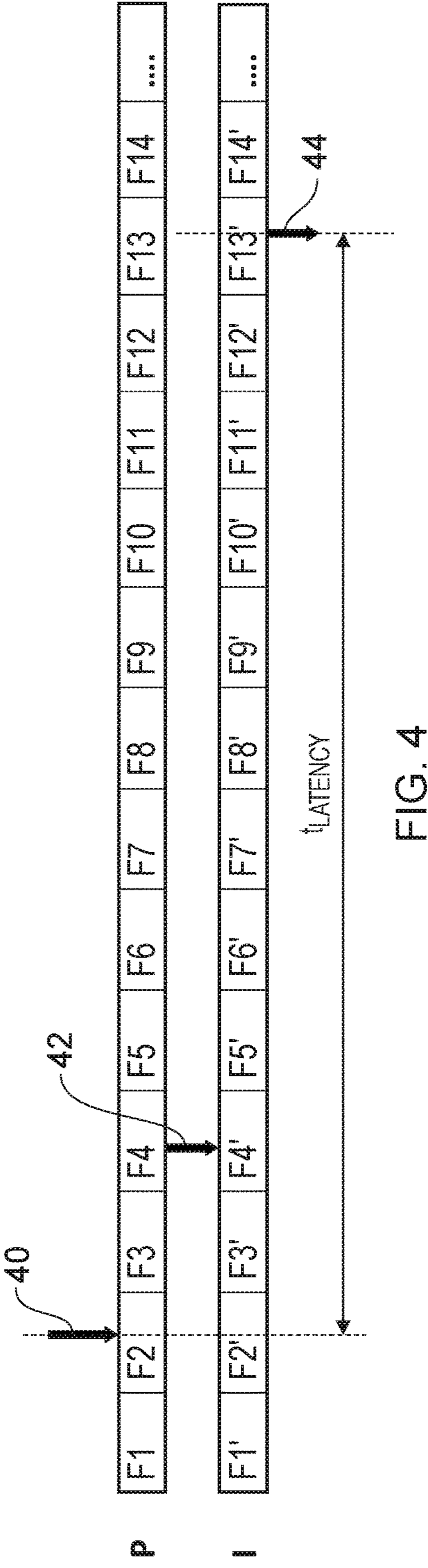
FIG. 4 shows how a trigger event measured by the probe is used to create a trigger output from the interface.

Referring to FIG. 4, the collection of a touch trigger point using the probe and interface described above will be illustrated. As outlined above, the probe and interface cycle through a series of frames together. In FIG. 4, the probe frames F1 to F14 are shown aligned with the interface frames F1' to F14'

The probe may sense a trigger event at any point in time. In this example, the trigger event 40 occurs during frame F2. The clock count within frame F2 (i.e., as measured using the probe clock) on detection of the trigger event is recorded. An accurate touch trigger measurement process relies on the interface always issuing a trigger signal a certain (invariant) time after the trigger event occurs. In this example, the trigger signal 44 is issued by the interface during the interface frame F13'. The delay (or latency) between the trigger event 40 and the trigger signal 44 is labelled as "$t_{latency}$" in FIG. 4.

Information about the trigger event is passed between the probe and interface by the exchange of messages. For example, in frame F4 the probe may transmit a message 42 that informs the interface that a measurement event has been detected and that it occurred at a particular clock count within frame F2. This message may be a few frames after the event occurred and there may be the option to retransmit the message multiple times in case communications on a certain frequency channel fail (e.g. due to interference). The interface may acknowledge receipt of this message (i.e. so the probe knows it has been safely received). The interface can then act on the information in the message. In particular, it then knows the frame and clock count within that frame associated during which the trigger event occurred. This enables the interface to calculate the time (i.e. the frame and clock count within that frame) at which the trigger signal 44 needs to be issued (i.e. to ensure it is delayed by $t_{latency}$ relative to the trigger event).

The above relies on the probe and interface clocks being synchronised (i.e. because the interface needs to map timings of the probe clock into timings relative to its own (interface) clock). It can thus be seen that the accuracy of the clocks used in the probe and interface will have a direct impact on the system's ultimate metrology capability because a change in probe status (i.e. a touch point) is sent as a timestamp relative to the start of the synchronised frame edges.

Although clock adjustments to maintain clock synchronisation have been used previously, such prior art techniques treated clock synchronisation separately to the communication of trigger event information. In other words, the clock adjustment (i.e., synchronisation) process could occur at any point in time relative to the communication of a trigger event (such trigger events being asynchronous events that may occur at any time). It was thus possible for there to be a change of clock timing at or around the time of a metrology point being recorded. The clock adjustment process was thus found to add an error to the latency, which appeared as jitter in the trigger signal. As will now be described in detail, the present invention removes this source of error by taking any clock adjustments into account when generating the trigger signal.

Figure 5:
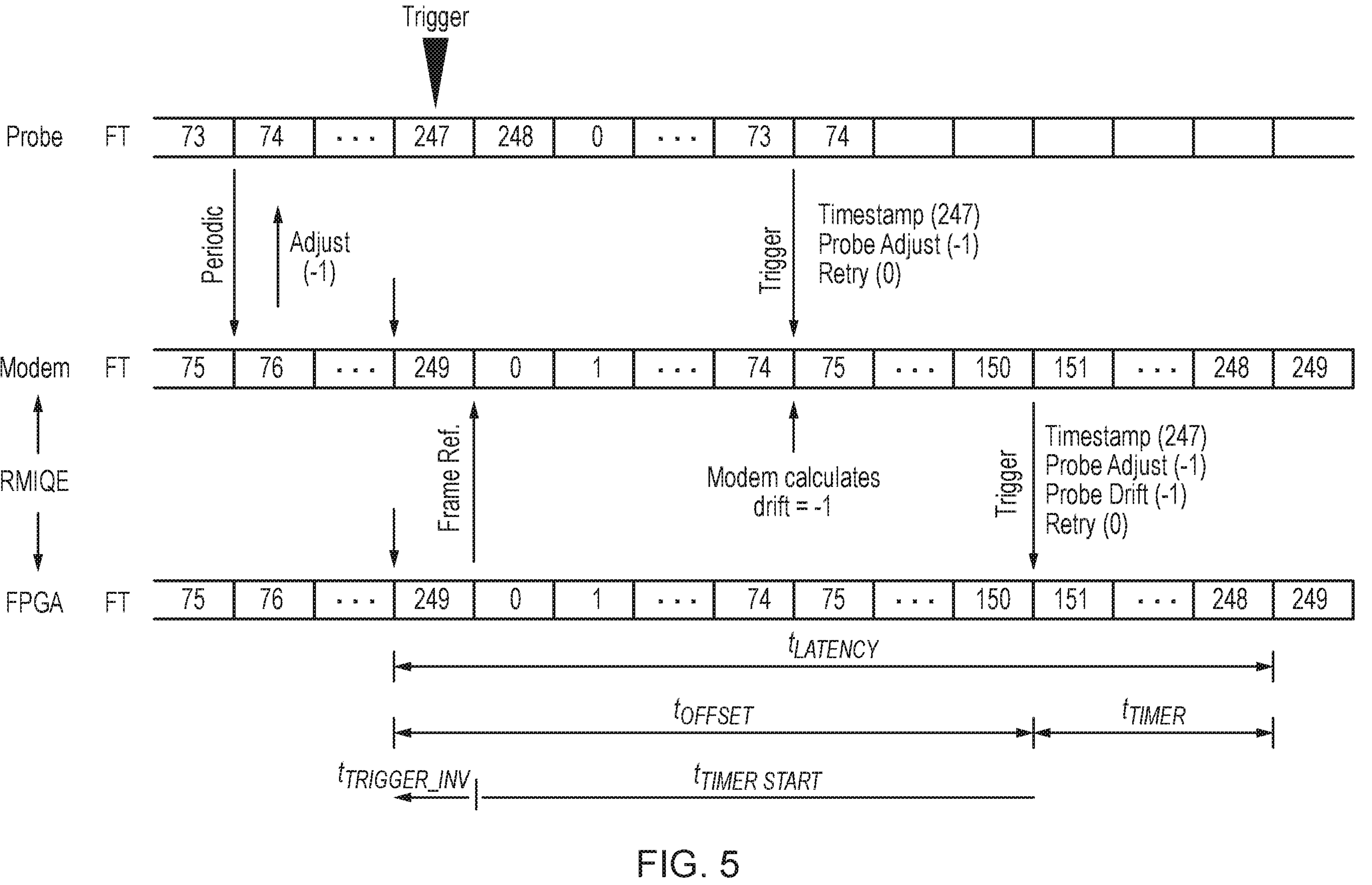
FIG. 5 illustrates how the correction for clock drift can be taken into account when generating a trigger output.

Referring next to FIG. 5, a technique for taking clock adjustments and drift into account when communicating touch trigger events from a probe to an interface (also termed the RMI-QE) is described.

As explained above, the goal of the metrology system is to assert the SKIP or status output of the RMI-QE (i.e., the trigger signal output from the interface) a fixed latency after the probe receives a trigger. The latency must be as short as possible and have very low jitter. The latency is shown in the diagram as $t_{LATENCY}$ and is 2.5 ms in this example.

The frame timer on both the probe and interface is running at 250 μs, so there are 10 frames in the 2.5 ms latency. This will allow 1 frame for the trigger, 1 "housekeeping" frame to allow the transmission to be scheduled, 1 frame for transmitting the message, and 7 frames for retries.

In this example, initially the probe sends an ordinary periodic message to the RMI-QE interface. The periodic message from the probe is always sent at a specific offset within the frame ($t_{PROBE\_SEND}$). In this example the offset is 74 µs. The RMI-QE modem (interface) receives this message towards the end of the 75th microsecond, and it calculates the probe has drifted by −1 µs and needs to apply an adjustment of −1 µs ($t_{ADJUST}$) to bring the two frame timers into sync. The RMI-QE sends the adjustment message to the probe a few microseconds later, and the probe applies the adjustment, which takes effect at the end of the next frame.

Towards the end of the next frame, a trigger is received ($t_{TRIGGER}$); this is shown at 247 µs into the frame. Note that the adjustment to the frame length to bring it into line with the RMI-QE frame timer has not yet taken effect. To reduce jitter, it is clear from the diagram that although the trigger occurred at 247 µs on the probe frame timer, the RMI-QE needs to calculate that it occurred at 249 µs on its own frame timer.

On the second frame after the trigger occurred, the probe will send the timestamp ($t_{TRIGGER}$), the adjustment it applied ($t_{ADJUST}$), and the number of retries to the modem on the RMI-QE. In the example, because the probe frame timer is drifting, it has drifted into the 75th microsecond again, so the RMI-QE calculates that the probe has drifted by 1 µs ($t_{DRIFT}$).

It should be noted that preferably no frame timer adjustments are applied in frames after a trigger event and before the event acknowledgment has been received from the RMI-QE interface. For example, if the trigger event occurs in the same frame as a periodic message containing a probe adjust value, the adjustment should not be applied. Instead, the interface will calculate the drift compensation required when it receives the event message, and this will be used to correct the latency.

The acknowledgment to the event message will contain an adjustment value for the probe and this can then be used to correct the clock in the probe. Sometime later in the frame, at the serial peripheral interface (SPI) interval (225 µs in our example), the modem will send all this information back to the FPGA of the RMI-QE interface. The information sent is:

$t_{TRIGGER}=247$
$t_{ADJUST}=-1$
$t_{DRIFT}=-1$
RETRIES=0

After the FPGA has received this data, it calculates the remaining time until it needs to assert the SKIP output ($t_{TIMER}$). To do this, it subtracts all the delays in the transmission system from the latency ($t_{LATENCY}$=2.5 ms). The delays have been marked as $t_{OFFSET}$. It can be seen from the diagram that $t_{OFFSET}$ consists of the offset within the frame that the FPGA will start the time ($t_{TIMER\_START}$, 225 µs in the example), the distance of the timestamp ($t_{TRIGGER}$) from the end of the frame that it occurred in ($t_{TRIGGER\_INV}$) and any retries that have occurred.

In order to run the timer in the FPGA using a minimum possible latency and allow for the maximum possible clock drift, it is also necessary for the timer to be started a minimum of 20 µs before the end of the frame in which the event data is received: $t_{TIMERSTART\_MAX}$=230 µs. If this is not possible then a drift allowance will need to be added to the timer to prevent a negative timer value being requested.

It should also be noted that the timestamp from the probe ($t_{TRIGGER}$, 247 µs) needs to be tweaked to get the correct timestamp (249 µs). To do this, the adjust and drift values need to be subtracted from the timestamp:

$$t_{TIMESTAMP} - t_{ADJUST} - t_{DRIFT}$$
$$= 47 - -1 - -1$$
$$= 249$$

So to calculate $t_{TIMER}$:

$$t_{TIMER} = t_{LATENCY} - t_{TIMERSTART} - t_{TRIGGERINV} - R \times t_{FRAME}$$

The value of $t_{LATENCY}$ will vary depending on whether the calculation is being performed in the RMI-QE interface. For the RMI-QE this will be:

$$t_{LATENCY} = t_{OUTPUT\_LATENCY} - (n_{FRAMES\_BEFORE\_RX} \times t_{FRAME})$$

$$t_{LATENCY} = 2.5\ \text{ms} - (2 \times 250\ \mu\text{s})$$

$$t_{LATENCY} = 2.0\ \text{ms}$$

$t_{TRIGGER\ INV}$ can be calculated by taking the trigger timestamp away from the frame length.
Therefore (RMI-QE):

$$t_{TIMER} = t_{LATENCY} - t_{TIMERSTART} - (t_{FRAME} - (t_{TIMESTAMP} - t_{ADJUST} - t_{DRIFT})) - R \times t_{FRAME}$$

$$t_{TIMER} = 2.0\ \text{ms} - 230\ \mu\text{s} - (250\ \mu\text{s} - (247\ \mu\text{s} - -1\ \mu\text{s} - -1\ \mu\text{s})) - 0 \times 250\ \mu\text{s}$$

$$t_{TIMER} = 2000\ \mu\text{s} - 230\ \mu\text{s} - (250\ \mu\text{s} - (249\ \mu\text{s}))$$

$$t_{TIMER} = 2000\ \mu\text{s} - (231\ \mu\text{s})$$

$$t_{TIMER} = 1769\ \mu\text{s}$$

The above technique thus permits clock adjustments to ensure the probe and interface clocks remain synchronised but allows this to be done without impacting on metrology accuracy. In particular, the jitter previously seen due to the clock adjustment process is removed.

Although the above examples relate to touch trigger measurement probes and associated probe interfaces, the same technique can be used for the transmission of any measurement data. For example, ultrasound, scanning points or other metrology data could be transmitted. Similarly, operation in the 2.4 GHz radio band is provided merely as an example and is not intended to restrict the scope of the present invention. Other features of WO2004/057552 may also be included in the system.

The invention claimed is:

1. A frequency hopping radio communications system comprising a measurement station having a first clock and an interface station having a second clock, wherein:

the measurement station is configured to transmit measurement information arising from a measurement event, the measurement information including timing information that relates the measurement event to the first clock, the interface station is configured to receive the measurement information from the measurement station and to generate a measurement output including timing information defined relative to the second clock;

one of the first and second clocks is designated as a master clock and a periodic clock adjustment of the other of the first and second clocks is performed to maintain synchronisation with the designated master clock;

the timing information of the measurement output generated by the interface station takes into account any of the periodic clock adjustments that are applied between occurrence of the measurement event and the generation of the measurement output; and the measurement station is provided as part of a measurement device, the measurement device also including a measurement sensor.

2. The frequency hopping radio communications system according to claim 1, wherein the measurement information transmitted by the measurement station is timestamped relative to the time defined by the first clock.

3. The frequency hopping radio communications system according to claim 2, wherein the measurement station transmits information to the interface station using a series of frames and the measurement information is timestamped to define a time relative to an edge of a transmitted frame.

4. The frequency hopping radio communications system according to claim 1, wherein the first and second clocks each generate clock counts, and the periodic clock adjustment comprises incrementing or decrementing the clock count of the other of the first and second clocks to maintain synchronisation with the designated master clock.

5. The frequency hopping radio communications system according to claim 1, wherein the periodic clock adjustment comprises the exchange of messages between the measurement and interface stations that include timing information.

6. The frequency hopping radio communications system according to claim 1, wherein the periodic clock adjustment is performed at regular intervals.

7. The frequency hopping radio communications system according to claim 1, wherein the second clock is the master clock and the periodic clock adjustment comprises adjusting the first clock to remain synchronised with the second clock.

8. The frequency hopping radio communications system according to claim 1, wherein the measurement station and the interface station comprise frequency hopping spread spectrum modems operating using a same hopping pattern.

9. The frequency hopping radio communications system according to claim 1, wherein the measurement sensor comprises a touch trigger sensor.

10. The frequency hopping radio communications system according to claim 9, wherein the measurement event comprises a touch trigger event as sensed by the touch trigger sensor.

11. The frequency hopping radio communications system according to claim 10, wherein the measurement output generated by the interface station comprises a trigger signal.

12. The frequency hopping radio communications system according to claim 1, wherein the measurement event comprises an asynchronous measurement event.

13. The frequency hopping radio communications system according to claim 12, wherein delay between the asynchronous measurement event being recorded by the measurement station and the generation of the measurement output by the interface station is unaffected by any periodic clock adjustments that are applied between the measurement event and the generation of the measurement output.

14. A frequency hopping radio communications system comprising a measurement station having a first clock and an interface station having a second clock, wherein:

the measurement station is configured to transmit measurement information arising from a measurement event, the measurement information including timing information that relates the measurement event to the first clock;

the interface station is configured to receive the measurement information from the measurement station and to generate a measurement output including timing information defined relative to the second clock;

one of the first and second clocks is designated as a master clock and a periodic clock adjustment of the other of the first and second clocks is performed to maintain synchronisation with the designated master clock;

the timing information of the measurement output generated by the interface station takes into account any of the periodic clock adjustments that are applied between occurrence of the measurement event and the generation of the measurement output;

the measurement information transmitted by the measurement station is timestamped relative to a time defined by the first clock; and the measurement station transmits information to the interface station using a series of frames and the measurement information is timestamped to define a time relative to an edge of a transmitted frame.

15. The frequency hopping radio communications system according to claim 14, wherein the measurement station and the interface station comprise frequency hopping spread spectrum modems operating using a same hopping pattern.

16. A frequency hopping radio communications system, comprising a measurement station having a first clock and an interface station having a second clock, wherein:

the measurement station is configured to transmit measurement information arising from a measurement event, the measurement information including timing information that relates the measurement event to the first clock;

the interface station is configured to receive the measurement information from the measurement station and to generate a measurement output including timing information defined relative to the second clock;

one of the first and second clocks is designated as a master clock and a periodic clock adjustment of the other of the first and second clocks is performed to maintain synchronisation with the designated master clock;

the timing information of the measurement output generated by the interface station takes into account any of the periodic clock adjustments that are applied between occurrence of the measurement event and the generation of the measurement output; and the measurement event comprises an asynchronous measurement event.

17. The frequency hopping radio communications system according to claim 16, wherein delay between the asynchronous measurement event being recorded by the measurement station and the generation of the measurement output by the interface station is unaffected by any periodic clock adjustments that are applied between the measurement event and the generation of the measurement output.

18. The frequency hopping radio communications system according to claim 16, wherein the measurement station and the interface station comprise frequency hopping spread spectrum modems operating using a same hopping pattern.

* * * * *